2 Sheets—Sheet 1.

S. B. CASTLE.
Hay-Loading Machine.

No. 222,662. Patented Dec. 16, 1879.

ATTEST:
E. Laass.
G. W. Hey.

INVENTOR:
Simeon B. Castle
per Duell, Laass & Hey,
attorneys

2 Sheets—Sheet 2.
S. B. CASTLE.
Hay-Loading Machine.
No. 222,662. Patented Dec. 16, 1879.
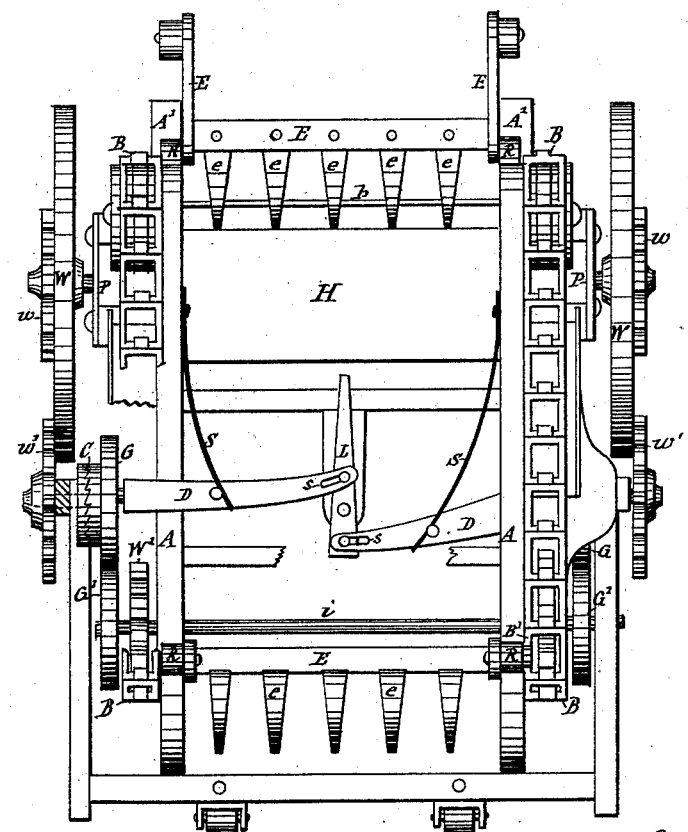
Fig. 3
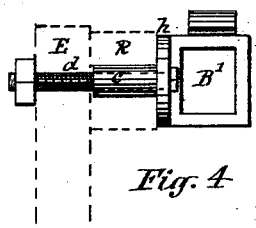
Fig. 4
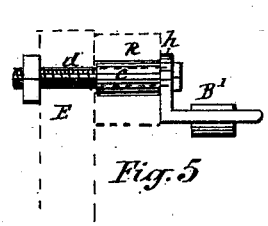
Fig. 5
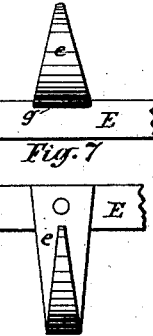
Fig. 6
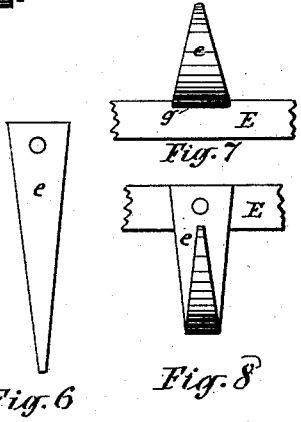
Fig. 7
Fig. 8
ATTEST:
E. Laass
G. W. Hey
INVENTOR:
Simeon B. Castle
per Duell, Laass & Hey
Attorneys

UNITED STATES PATENT OFFICE.

SIMEON B. CASTLE, OF SYRACUSE, NEW YORK.

IMPROVEMENT IN HAY-LOADING MACHINES.

Specification forming part of Letters Patent No. 222,662, dated December 16, 1879; application filed September 29, 1879.

*To all whom it may concern:*

Be it known that I, SIMEON B. CASTLE, of Syracuse, in the county of Onondaga, in the State of New York, have invented new and useful Improvements in Hay-Loading Machines, of which the following, taken in connection with the accompanying drawings, is a full, clear, and exact description.

This invention relates to machines designed to rake and gather hay on the ground and deposit the same onto a wagon.

The improvements consist, first, in the combination, with the frame, its guide-rail, and the pivoted carrier-frames having flexible rake-teeth, of a rod connecting the two guide-rails, and serving to draw the hay from the rakes and prevent the waste incident to exposure to wind, and a rearwardly-inclined platform connected to the upper portion of the machine, whereby the frame is thoroughly braced and the inverted rakes are returned to their proper operative position without incurring jars or liability of breaking the same; second, in connecting the front guard-rail to the main frame of the machine by means of a slotted tie-plate, which admits of adjusting the guard-rail in its distance from the said frame, and thus compensating for wear or shrinkage of the parts; third, in the combination, with the carrier-frame, of a chain-link provided with a sleeve, a roller mounted on said sleeve, and a bolt passing through the sleeve and carrier-frame; fourth, in a novel, simple, and comparatively inexpensive construction of a rake-tooth, which is capable of yielding to obstructions encountered in its passage over the surface of the ground, and durable and effective in operation, all constructed and arranged as hereinafter more fully described.

Figure 1:
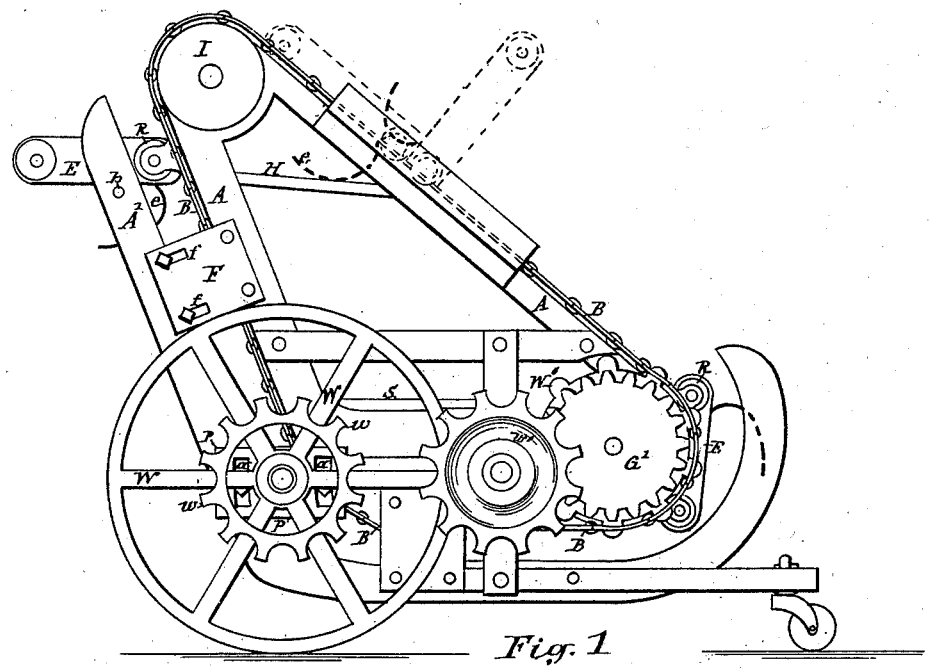
Figure 2:
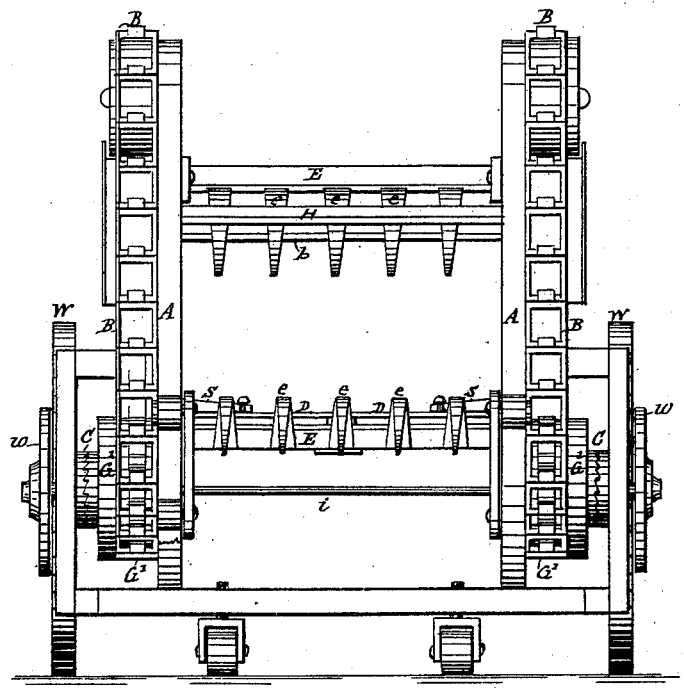

In the accompanying drawings, Figure 1 is a side elevation of my improved hay-loading machine; Fig. 2, a rear end view of the same; Fig. 3, a plan view; Figs. 4 and 5, enlarged plan and end views, respectively, of the device for connecting the carriers and their friction-rollers to the elevator-chains. Fig. 6 is an enlarged plan view of a blade of which my improved rake-tooth is formed; and Figs. 7 and 8 are front and plan views, respectively, of the rake-tooth as applied to the carrier-frame.

Similar letters of reference indicate corresponding parts.

A represents the main frame of the machine, made in the form of an obtuse triangle, having one of the limbs of the obtuse angle at the base and the other limb inclined toward the front of the machine. It is supported upon rollers or wheels at the rear end and by traction-wheels W, pivoted to the forward end, in the manner hereinafter more fully described.

The upper and rear corners of the frame A are rounded in the form of an arc described from the center of pulleys I and chain-wheels $w'$, pivoted to the outside of the frame A at the said corners, respectively.

B denotes the endless chains carried by the pulleys I and chain-wheels $w'$ aforesaid. At proper intervals in the endless chains a link, B', is provided, on its inner edge, with a flange, $h$, from which a sleeve or tube, $c$, projects inward. The sleeve $c$ is of a length equal to the width of the roller R, which is mounted thereon and travels on the exterior edge of the frame A. Through the sleeve $c$ passes a bolt, $d$, by means of which the carrier-frame E is connected with the chain B and roller R. The chains B receive motion from the traction-wheels W, which are mounted on a stud or gudgeon projecting from a plate, P, secured to the forward end of the frame A. The tractive power of the wheels W is transmitted to a chain-wheel, $w'$, pivoted to the frame A at the rear of the traction-wheels by the medium of a chain, (not shown in the drawings,) which chain is extended around the chain-wheel $w'$ and a chain-wheel, $w$, attached to the traction-wheel. Upon the axis of the chain-wheel $w'$ is loosely mounted a gear-wheel, G, which receives motion from the said chain-wheel by means of a clutch, C, connected, respectively, to the axis of the chain-wheel and gear. The gear G meshes in a gear-wheel, G', attached to a shaft, $i$, extended across the rear end of the frame A, to which shaft is also attached the chain-wheel W', which imparts motion to the endless chain B.

The interposition of the clutch C between the gear-wheel G and chain-wheel W' renders the operation of the machine adjustable, so that by throwing the clutch in or out of connection motion can be imparted to the machine or arrested at will.

The change is effected by means of a lever, L, pivoted centrally between the gears G G at opposite sides of the machines, and arms D D extended from said lever to the gears, and engaging the hub of same in a manner which allows them to revolve.

By the thrust of the lever L the gear-wheel G, and its thereto connected part of the clutch C, is moved in or out on the shaft or axis of the chain-wheel W', and thus the clutch thrown in or out of connection, as may be desired.

When it is desired to have the connection of the actuating mechanism automatic, I apply to the arm D a spring, S, which imparts thereto an outward pressure.

By passing the bolt which connects the arms to the lever L through a slot, s, in the arm, the necessary play is allowed to the lever.

To allow the frame A to be raised or lowered without deranging the connection of the actuating mechanism, I provide the plate P, which supports the traction-wheel W, with curved slots a, through which the attaching-bolts pass, the slots having the curvature of an arc described from the center of the axis of the chain-wheel w', thereby maintaining the traction-wheel at a uniform distance from the chain-wheel w' at any depression or elevation of the frame A.

The front guard-rail, A', is connected with the frame A by means of a tie-plate, F, having slots f, through which pass clamp-bolts connected with the rail A', thereby allowing the said rail to be set at a greater or less distance from the end of the frame A, as may be required, to compensate for wear or shrinkage of said parts.

The two guard-rails are connected with each other, near their upper end, by a cross-bar, b, which braces the said rails and arrests the ascending carrier E after its free end has passed above the extremity of the guard-rail, and throws the same into an inverted position. Simultaneously with the said movement the hay is drawn off the rake by the bar b. The pressure of the bar b upon the hay prevents the waste incident to exposure to wind.

H is a platform extended across the upper part of the frame A, and slightly inclined toward the rear. This platform braces the upper portion of the frame A, and, by the collision therewith of the rake-teeth of the descending inverted carrier-frames, the said frames are gradually turned over and brought into their requisite position for raking and gathering the hay on the ground.

The rake-teeth e, I construct of sheet metal, preferably of sheet-steel, by shearing therefrom strips of a gradually-tapered width, as shown in Fig. 6 of the drawings, which strips I bend to give them the requisite hook shape, and secure them at their broad end to the cross-bar of the carrier-frame E, having a dovetail countersink into which the tooth is fitted. A tooth of this form, and attached in the manner aforesaid, is capable of yielding to ordinary obstructions encountered in the ground during the operation of the machine, and also of resisting undue lateral strain. Besides this it is exceedingly simple and cheap in construction.

Having thus described my invention, what I claim as new, and desire to secure by Letters Patent, is—

1. The combination of the frame A, guard-rail A', and the plate F, the latter provided with slots f, substantially as and for the purpose set forth.

2. The carrier-frame E, in combination with the link B', provided with sleeve C, the roller R, and bolt d, substantially as described and shown.

3. In combination with the frame A, guide-rails A', and pivoted carrier-frames E, having flexible rake-teeth e, the rod b, connecting the guide-rails, and the inclined platform H, attached to the upper part of the frame, substantially as described and shown, for the purpose set forth.

4. The rake-tooth e, when formed of sheet metal, and with a gradually-tapering width, substantially as described and shown.

In testimony whereof I have hereunto signed my name and affixed my seal in the presence of two attesting witnesses, at Syracuse, in the county of Onondaga and State of New York, this 25th day of September, 1879.

SIMEON B. CASTLE. [L. S.]

Witnesses:
E. LAASS,
C. BENDIXEN.